United States Patent
Lin

(10) Patent No.: US 11,854,300 B2
(45) Date of Patent: Dec. 26, 2023

(54) FINGERPRINT MODULE, FINGERPRINT RECOGNITION SYSTEM, AND ELECTRONIC DEVICE

(71) Applicant: VIVO MOBILE COMMUNICATION CO., LTD., Dongguan (CN)

(72) Inventor: Huaxin Lin, Dongguan (CN)

(73) Assignee: VIVO Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 17/943,821

(22) Filed: Sep. 13, 2022

(65) Prior Publication Data

US 2023/0005292 A1    Jan. 5, 2023

Related U.S. Application Data

(63) Continuation of application No. PCT/CN2021/071480, filed on Jan. 13, 2021.

(30) Foreign Application Priority Data

Mar. 24, 2020 (CN) .......................... 202010211219.1

(51) Int. Cl.
*G06V 40/13* (2022.01)
*G06V 40/12* (2022.01)

(52) U.S. Cl.
CPC ...... *G06V 40/1324* (2022.01); *G06V 40/1318* (2022.01); *G06V 40/1365* (2022.01)

(58) Field of Classification Search
None
See application file for complete search history.

(56) References Cited

U.S. PATENT DOCUMENTS

| | | | |
|---|---|---|---|
| 2011/0064282 A1 | 3/2011 | Abramovich et al. | |
| 2018/0239941 A1* | 8/2018 | Mackey | G06V 40/1318 |
| 2019/0138828 A1 | 5/2019 | Hogan | |
| 2020/0119108 A1* | 4/2020 | Park | H10K 59/65 |
| 2021/0217003 A1* | 7/2021 | Karaivanov | G06Q 20/405 |

FOREIGN PATENT DOCUMENTS

| | | |
|---|---|---|
| CN | 101881883 A | 11/2010 |
| CN | 204945526 U | 1/2016 |
| CN | 209496381 U | 10/2019 |
| CN | 111428638 A | 7/2020 |

* cited by examiner

*Primary Examiner* — Joseph R Haley
(74) *Attorney, Agent, or Firm* — The Webb Law Firm

(57) ABSTRACT

A fingerprint module includes: a lens, a crystal, and an optical fingerprint chip, where the crystal is an anisotropic medium, the lens is located on one side of the crystal, the optical fingerprint chip is located on the other side of the crystal, and the optical fingerprint chip is fixed in a substrate of an electronic device. Incident light including fingerprint information is incident to the crystal through the lens and is incident to the optical fingerprint chip after being refracted by the crystal; and the optical fingerprint chip is used for generating a fingerprint image, and the fingerprint image is used for fingerprint recognition.

17 Claims, 3 Drawing Sheets

FINGERPRINT MODULE, FINGERPRINT RECOGNITION SYSTEM, AND ELECTRONIC DEVICE

CROSS-REFERENCE TO RELATED APPLICATIONS

This application is a Bypass Continuation Application of PCT/CN2021/071480 filed on Jan. 13, 2021, which claims priority to Chinese Patent Application No. 202010211219.1 filed Mar. 24, 2020, the disclosures of which are hereby incorporated by reference in their entirety.

BACKGROUND OF THE INVENTION

Field of the Invention

The present disclosure relates to the field of fingerprint recognition, and in particular, to a fingerprint module, a fingerprint recognition system, and an electronic device.

Description of Related Art

Currently, a mobile terminal may be unlocked through an optical fingerprint.

Optionally, a fingerprint module may be arranged below a screen of the mobile terminal. The fingerprint module may include a lens, a light filter, and an optical fingerprint chip. During unlocking, a user may press the screen with a finger, the screen emits light, the generated light may illuminate the fingerprint of the finger, and reflected light including fingerprint information illuminates the light filter through the lens. After being filtered by the light filter, the light may be transmitted to the optical fingerprint chip, and the optical fingerprint chip may generate a fingerprint image. When the fingerprint image is consistent with a fingerprint image reserved in the mobile terminal, the mobile terminal is unlocked.

However, during transmission of the light, a moire pattern may be generated between the fingerprint module and the screen. As a result, the fingerprint image generated by the optical fingerprint chip includes both the fingerprint and the moire pattern, so as to affect fingerprint recognition and further lower recognition accuracy of the optical fingerprint.

SUMMARY OF THE INVENTION

Embodiments of the present disclosure provide a fingerprint module, a fingerprint recognition system, and an electronic device.

According to a first aspect, a fingerprint module is provided, including a lens, a crystal, and an optical fingerprint chip, the crystal being an anisotropic medium, where
  the lens is located on one side of the crystal, the optical fingerprint chip is located on the other side of the crystal, and the optical fingerprint chip is fixed in a substrate of an electronic device; and
  incident light including fingerprint information is incident to the crystal through the lens and is incident to the optical fingerprint chip after being refracted by the crystal, the optical fingerprint chip is used for generating a fingerprint image, and the fingerprint image is used for fingerprint recognition.

According to a second aspect, a fingerprint recognition system is provided, including the above fingerprint module.

According to a third aspect, an electronic device is provided, including the above fingerprint recognition system.

BRIEF DESCRIPTION OF THE DRAWINGS

Accompanying drawings described herein are used for providing understanding about the present disclosure, and constitute one portion of the present disclosure. Exemplary embodiments of the present disclosure and descriptions thereof are used for explaining the present disclosure, and do not constitute an inappropriate limitation on the present disclosure. In the accompanying drawings.

DESCRIPTION OF THE INVENTION

Figure 1:
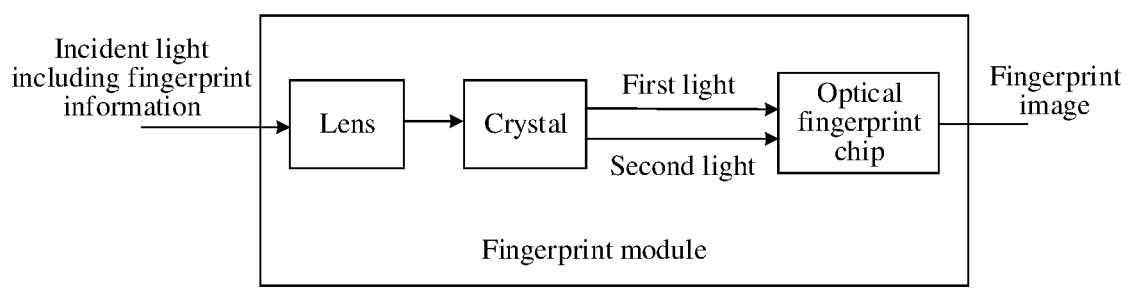
FIG. 1 is a schematic structural diagram of a fingerprint module according to an embodiment of the present disclosure.

With the development of science and technology, a user may unlock a mobile terminal through an optical fingerprint. Generally, a fingerprint module may be arranged below a screen of the mobile terminal. During unlocking, the user may press the screen with a finger, the screen may emit light to illuminate the fingerprint of the finger. After being reflected, incident light including fingerprint information may be incident to the fingerprint module, and the incident light may illuminate an optical fingerprint chip through a lens and a light filter in sequence. The optical fingerprint chip may generate a fingerprint image, and when the fingerprint image is consistent with a fingerprint image reserved in the mobile terminal, the mobile terminal is unlocked.

Generally, after the above incident light illuminates the optical fingerprint chip, in a case that a spatial frequency of the incident light is relatively low, the optical fingerprint chip may generate a clear fingerprint image, where the spatial frequency may represent the clarity of the image, and the higher the spatial frequency, the clearer the image. However, since reflected light passes through the screen before illuminating the optical fingerprint chip, the reflected light may be affected by the screen, causing the spatial frequency of the reflected light to be the same as the spatial frequency of the screen, and pixels of the fingerprint information to be the same as pixels of the screen. Generally, the spatial frequency of the screen is relatively high. Therefore, the spatial frequency of the reflected light illuminating the optical fingerprint chip is also relatively high. In this way, in a case that the reflected light has a relatively high spatial frequency, the pixels of the fingerprint information will be parallel to pixels of the optical fingerprint chip. As a result, the moire pattern is generated between the fingerprint module and the screen, and further the fingerprint image generated by the optical fingerprint chip includes the moire pattern. Since the fingerprint is similar to the moire pattern, the fingerprint image is not clear in a case that the fingerprint image includes the moire pattern, so as to affect the recognition accuracy of the optical fingerprint.

Currently, in order to eliminate the moire pattern, the fingerprint module may be largely rotated relative to the screen. In this way, in a case that the pixels of the screen and the pixels of the optical fingerprint chip form a certain angle, it is hard to generate the moire pattern. However, the actual effect of this manner is not good, and the moire pattern cannot be completely eliminated. In addition, since the fingerprint module needs to be fixed on a middle frame of the mobile terminal, if the fingerprint module is rotated by a certain angle, a part of the space on the mainboard is occupied, decreasing a space utilization rate of the middle frame.

To resolve the above technical problem, the embodiments of the present disclosure provide a fingerprint module, a fingerprint recognition system, and an electronic device. The fingerprint module includes a lens, a crystal and an optical fingerprint chip, the crystal being an anisotropic medium, where the lens is located on one side of the crystal, the optical fingerprint chip is located on the other side of the crystal, and the optical fingerprint chip is fixed in a substrate of an electronic device. Incident light including fingerprint information is incident to the crystal through the lens and is incident to the optical fingerprint chip after being refracted by the crystal; and the optical fingerprint chip is used for generating a fingerprint image, and the fingerprint image is used for fingerprint recognition.

In this way, since the crystal is the anisotropic medium and the anisotropic medium has a birefringent effect, the optical fingerprint chip may generate the fingerprint image without a moire pattern based on the light refracted by the crystal, so as to eliminate the moire pattern and improve accuracy of the fingerprint recognition.

In addition, since the moire pattern may be eliminated through the birefringent effect of the crystal rather than a manner of rotating the fingerprint module relative to a screen, the space of a mainboard may be saved and a space utilization rate of a middle frame may be increased.

The following clearly describes the technical solutions in embodiments of the present disclosure with reference to the accompanying drawings in the embodiments of the present disclosure. Apparently, the described embodiments are some of the embodiments rather than all of the embodiments of the present disclosure. All other embodiments derived by a person of ordinary skill in the art based on the embodiments of the present disclosure shall fall within the protection scope of the present disclosure.

It is to be noted that the main idea of the embodiments of the present disclosure is to replace the light filter in the current fingerprint module with the crystal, where the crystal is the anisotropic medium and has birefringent effect. Therefore, based on the birefringent effect of the crystal itself, the crystal may refract the incident light into second light and first light. On one hand, the spatial frequency of the second light and the spatial frequency of the first light may be less than the spatial frequency of the incident light. On the other hand, the distance between the second light and the first light may be a first preset distance, so as to effectively avoid generating the moire pattern in the fingerprint image.

The technical solutions provided in the embodiments of the present disclosure are described in detail below with reference to the accompanying drawings.

FIG. 1 is a schematic structural diagram of a fingerprint module according to an embodiment of the present disclosure. As shown in FIG. 1, the fingerprint module may include a lens, a crystal, and an optical fingerprint chip, where the crystal is an anisotropic medium.

In FIG. 1, the lens is located on one side of the crystal, the optical fingerprint chip is located on the other side of the crystal, and the optical fingerprint chip may be fixed in a substrate of an electronic device, where the substrate may be understood as an integrated circuit board in the electronic device, and be configured to integrate various chips and circuits in the electronic device.

In this embodiment, incident light including fingerprint information may be incident to the crystal through the lens.

Optionally, when a user unlocks a mobile terminal through an optical fingerprint, a finger may be used to execute a pressing operation on a screen of the mobile terminal, and the screen may generate the incident light after receiving the pressing operation. The incident light may illuminate the fingerprint of the finger, so that the incident light includes the fingerprint information of the finger. After that, the incident light including the fingerprint information may be incident to the lens shown in FIG. 1 through the screen, and then be incident to the crystal shown in FIG. 1 through the lens.

It is to be noted that since the incident light passes through the screen before being incident to the lens, the spatial frequency of the incident light is equal to the spatial frequency of the screen.

In FIG. 1, after the incident light is incident to the crystal through the lens, since the crystal is the anisotropic medium and the anisotropic medium has a birefringent effect, the optical fingerprint chip may generate the fingerprint image without a moire pattern based on the light refracted by the crystal so as to eliminate the moire pattern and improve accuracy of the fingerprint recognition.

Optionally, based on the birefringent effect of the crystal itself, the crystal may refract the incident light into first light and second light, where the first light and the second light are propagated in different directions in the crystal and have different propagation speeds. The spatial frequency of the first light and the spatial frequency of the second light are less than the spatial frequency of the incident light, and the distance between the first light and the second light may be a first preset distance, where the first preset distance is a horizontal distance between the first light and the second light after being emergent from the crystal. The spatial frequency of the incident light may be effectively reduced in a case that the distance between the second light and the first light is the first preset distance.

After the first light and the second light are incident to the optical fingerprint chip, the optical fingerprint chip may generate a fingerprint image without the moire pattern.

That is to say, the crystal may effectively reduce the spatial frequency of the incident light while the crystal refracts the incident light into the first light and the second light, so that the spatial frequency of the incident light may satisfy the requirement of the optical fingerprint chip on the spatial frequency of the incident light. On this basis, the moire pattern is not generated in the fingerprint image generated by the optical fingerprint chip.

In this way, with the birefringent effect of the crystal itself, the incident light including the fingerprint information is refracted into the first light and the second light which have relatively low spatial frequencies and between which the distance is the first preset distance, and when the first light and the second light illuminate the optical fingerprint chip, the optical fingerprint chip may generate the fingerprint image without the moire pattern based on the first light and the second light, so as to eliminate the moire pattern and improve the accuracy of the fingerprint recognition.

In addition, since the moire pattern may be eliminated through the birefringent effect of the crystal rather than a manner of rotating the fingerprint module relative to a screen, the space of a mainboard may be saved and a space utilization rate of a middle frame may be increased.

Optionally, the spatial frequency of the incident light may be reduced by the lens in this embodiment, that is, the spatial frequency of the incident light before being incident to the lens is greater than the spatial frequency of the incident light after passing through the lens. Correspondingly, the spatial frequency of the incident light after passing through the lens is greater than the spatial frequency of the first light and the spatial frequency of the second light.

That is to say, after the incident light including the fingerprint information is incident to the lens, the lens may reduce the spatial frequency of the incident light, and after the incident light is incident to the crystal through the lens, the crystal may reduce the spatial frequency of the incident light. Under the joint action of the lens and the crystal. the spatial frequency of the incident light may be effectively reduced.

Figure 3:
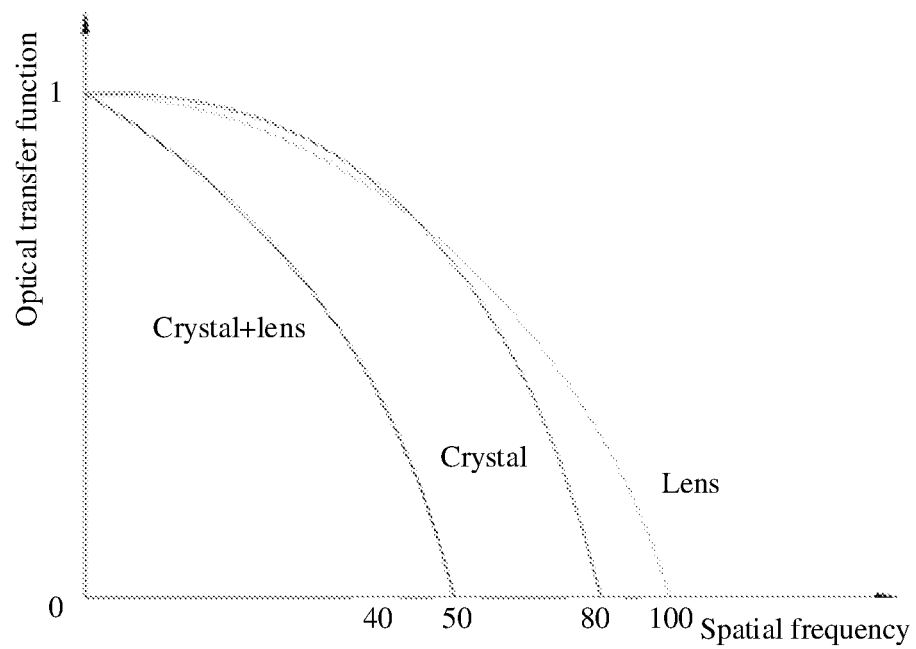
FIG. 3 is a curve graph of a relation between an optical transfer function and a spatial frequency according to an embodiment of the present disclosure.

Optionally, in order to understand how to effectively reduce the spatial frequency of the incident light under the joint action of the lens and the crystal more clearly, reference may be made to FIG. 3.

In FIG. 3, the vertical coordinate represents the optical transfer function, and the horizontal coordinate represents the spatial frequency. When the optical transfer function is 0, it indicates that the image is completely black, and when the optical transfer function is 1, it indicates that the image is sharp and clear.

As can be seen from FIG. 3, the optical transfer function of the lens is in a downward trend from low frequency to high frequency. When the spatial frequency is 100, the optical transfer function of the lens is 0, which means that after the incident light whose spatial frequency is 100 passes through the lens, the image generated is completely black. That is to say, after the incident light is incident to the lens, the lens may reduce the spatial frequency of the incident light to a value below 100.

The optical transfer function of the crystal is also in a downward trend from low frequency to high frequency. When the spatial frequency is 80, the optical transfer function of the crystal is 0, which means that after the incident light whose spatial frequency is 80 passes through the crystal, the image generated is completely black. That is to say, after the incident light is incident to the crystal, the crystal may reduce the spatial frequency of the incident light to a value below 80.

In conclusion, under the joint action of the lens and the crystal, when the spatial frequency of the incident light is 50, the optical transfer function is 0, which means that after the incident light whose spatial frequency is 50 passes through the lens and the crystal in sequence, the image generated is completely black. That is to say, after the incident light is incident to the lens and the crystal in sequence, the spatial frequency of the incident light may be reduced to a value below 50. In this way, after the incident light is incident to the crystal through the lens, the spatial frequency may be effectively reduced, so as to eliminate the moire pattern.

In this embodiment, when the first preset distance between the first light and the second light is equal to (2n+1) fringe widths, the spatial frequency of the incident light may be effectively reduced, so that the optical fingerprint chip generates the fingerprint image without the moire pattern, where n is an integer greater than or equal to 0. One fringe width may be understood as one line pair, and the line pair is related to the spatial frequency. Optionally, the unit of the spatial frequency is 1 p/mm, which means the number of line pairs included per millimeter. The higher the spatial frequency, the more the line pairs included per 1 mm.

Optionally, when the distance between the first light and the second light is equal to (2n+1) fringe widths, the light intensity of the first light and the second light is 0, where the light intensity represents the energy of the light passing through a unit area vertically in a unit time. Since the light intensity is positively correlated to the spatial frequency, the spatial frequency of the incident light may be effectively reduced in a case that the distance between the first light and the second light is equal to (2n+1) fringe widths. That is to say, for the convenience of reducing the spatial frequency of the incident light, the first preset distance may be caused to be equal to (2n+1) fringe widths (n is an integer greater than or equal to 0).

In this embodiment, according to the Huygens-Fresnel principle, the first preset distance and the thickness of the crystal may satisfy an equation:

$$d = T\frac{(n_o^2 - n_e^2)tg\theta}{n_o^2 tg^2\theta + n_e^2}$$

where d is the first preset distance, θ is an angle between the incident light and an optical axis, $n_o$ is a refractive index of the second light, $n_e$ is a refractive index of the first light, and T is the thickness of the crystal.

In this way, the distance between the first light and the second light may be caused to be the above first preset distance by adjusting the thickness of the crystal.

Based on the above formula, the thickness of the crystal is positively correlated to the first preset distance, that is, the larger the thickness of the crystal, the larger the first preset distance. In order to understand the relation between the first preset distance and the thickness of the crystal more clearly, reference may be made to FIG. 2A and FIG. 2B.

Figure 2A:
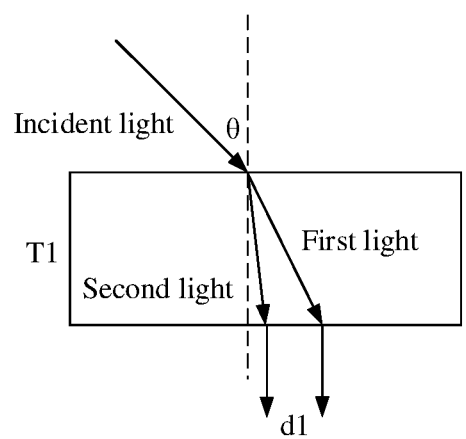
FIG. 2A is a schematic diagram of a relation between the thickness of a crystal and a first preset distance according to an embodiment of the present disclosure.
Figure 2B:
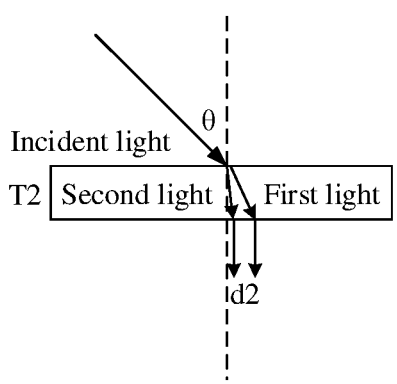
FIG. 2B is a schematic diagram of a relation between the thickness of a crystal and the first preset distance according to an embodiment of the present disclosure.

In FIG. 2A and FIG. 2B, the angle between the incident light and the optical axis is θ, the thickness of the crystal in FIG. 2A is T1, the thickness of the crystal in FIG. 2B is T2, and T1 is greater than T2.

In FIG. 2A, after the incident light passes through the crystal whose thickness is T1, the first preset distance between the first light and the second light is d1. In FIG. 2B, after the incident light with the same angle passes through the crystal whose thickness is T2, the first preset distance between the first light and the second light is d2. Apparently, d1 is greater than d2. That is to say, the first preset distance between the first light and the second light is positively correlated to the thickness of the crystal.

Optionally, the surface of the crystal may be plated with an optical thin film. In this way, after the incident light passes through the crystal, the optical thin film may eliminate ultraviolet light and red light in the incident light, to achieve the filtering function of a light filter in a current optical module.

Optionally, the crystal in this embodiment may be a lithium niobate birefringent crystal with a refractive index of 2.25.

In the technical solutions provided by the embodiments of the present disclosure, the fingerprint module may include the lens, the crystal, and the optical fingerprint chip, where the crystal is the anisotropic medium, the lens may be located on one side of the crystal, and the optical fingerprint chip may be located on the other side of the crystal and be fixed in the substrate of the electronic device. In this way, the incident light including the fingerprint information may illuminate the crystal through the lens and may illuminate the optical fingerprint chip after being refracted by the crystal. Since the crystal is the anisotropic medium and the anisotropic medium has a birefringent effect, the optical fingerprint chip may generate the fingerprint image without a moire pattern based on the light refracted by the crystal, so as to eliminate the moire pattern and improve accuracy of the fingerprint recognition.

In addition, since the moire pattern may be eliminated through the birefringent effect of the crystal rather than a manner of rotating the fingerprint module relative to a screen, the space of a mainboard may be saved and a space utilization rate of a middle frame may be increased.

Figure 4:
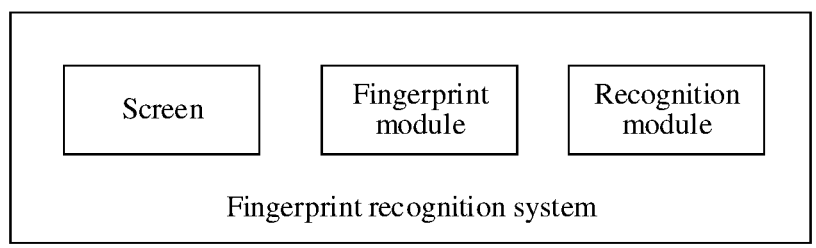
FIG. 4 is a schematic structural diagram of a fingerprint recognition system according to an embodiment of the present disclosure.

The embodiments of the present disclosure further provide a fingerprint recognition system. As shown in FIG. 4, the fingerprint recognition system includes the above fingerprint module, a screen, and a recognition module.

Incident light may be generated after the screen receives a pressing operation. The incident light may be used for illuminating a fingerprint of a user. After illuminating the fingerprint of the user, the incident light including fingerprint information may be reflected to the fingerprint module, where the fingerprint information included in the incident light is fingerprint information corresponding to the pressing operation and the spatial frequency of the incident light is the spatial frequency of the screen.

The fingerprint module may generate a fingerprint image without a moire pattern according to the incident light, and the recognition module may recognize the fingerprint image, so that when the fingerprint image is consistent with a reserved fingerprint image, a mobile terminal is unlocked.

Optionally, the fingerprint module may be rotated relative to the screen, where a rotation angle may be less than a preset angle, and the preset angle is less than or equal to 5°. In this way, the rotated fingerprint module may eliminate the moire pattern more comprehensively and the rotation angle may be less than the preset angle. In this way, the space of a mainboard may be saved and a space utilization rate of a middle frame may be increased.

Figure 5:
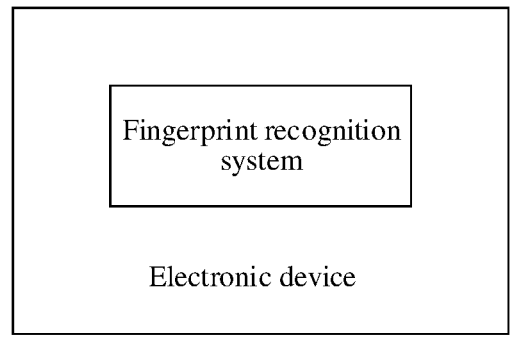
FIG. 5 is a schematic structural diagram of an electronic device according to an embodiment of the present disclosure.

The embodiments of the present disclosure further provide an electronic device. As shown in FIG. 5, the electronic device includes the above fingerprint recognition system.

It should be noted that the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by a sentence "including one" does not exclude that there are still other same elements in the process, method, object, or apparatus.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such understanding, the technical solutions in the present disclosure essentially or the part that contributes to the prior art may be embodied in the form of a software product, and the computer software product is stored in a storage medium (such as a ROM/RAM, a magnetic disk, or an optical disc), including several instructions used to cause a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific embodiments, which are merely illustrative rather than limited. Under the inspiration of the present disclosure, a person of ordinary skill in the art can make many forms without departing from the scope of the present disclosure and the protection of the claims, all of which fall within the protection of the present disclosure.

What is claimed is:

1. A fingerprint module, comprising a lens, a crystal, and an optical fingerprint chip, the crystal being an anisotropic medium, wherein
   the lens is located on one side of the crystal, the optical fingerprint chip is located on another side of the crystal, and the optical fingerprint chip is fixed in a substrate of an electronic device; and
   incident light comprising fingerprint information is incident to the crystal through the lens and is incident to the optical fingerprint chip after being refracted by the crystal, the optical fingerprint chip is used for generating a fingerprint image, and the fingerprint image is used for fingerprint recognition, wherein
   the incident light is refracted by the crystal into first light and second light, and the first light and the second light are propagated in different directions in the crystal and have different propagation speeds, wherein
   a spatial frequency of the first light and a spatial frequency of the second light are less than a spatial frequency of the incident light, and a distance between the first light and the second light is a first preset distance.

2. The fingerprint module according to claim 1, wherein a spatial frequency of the incident light before being incident to the lens is greater than a spatial frequency of the incident light after passing through the lens, and the spatial frequency of the incident light after passing through the lens is greater than a spatial frequency of the first light and a spatial frequency of the second light.

3. The fingerprint module according to claim 2, wherein the first preset distance and a thickness of the crystal satisfy an equation:

$$d = T\frac{(n_o^2 - n_e^2)tg\theta}{n_o^2 tg^2\theta + n_e^2},$$

wherein d is the first preset distance, θ is an angle between the incident light and an optical axis, no is a refractive index of the second light, ne is a refractive index of the first light, and T is the thickness of the crystal.

4. The fingerprint module according to claim 1, wherein the first preset distance is a distance between the first light and the second light after being emergent from the crystal, wherein the first preset distance is equal to (2n+1) fringe widths, one fringe width is one line pair, and n is an integer greater than or equal to 0.

5. The fingerprint module according to claim 1, wherein a surface of the crystal is plated with an optical thin film, and the optical thin film is used to eliminate ultraviolet light and red light in the incident light.

6. A fingerprint recognition system, comprising a fingerprint module, the fingerprint module comprising a lens, a crystal, and an optical fingerprint chip, the crystal being an anisotropic medium, wherein the lens is located on one side of the crystal, the optical fingerprint chip is located on another side of the crystal, and the optical fingerprint chip is fixed in a substrate of an electronic device; and incident light comprising fingerprint information is incident to the crystal through the lens and is incident to the optical fingerprint chip after being refracted by the crystal, the optical fingerprint chip is used for generating a fingerprint image, and the fingerprint image is used for fingerprint recognition, wherein the incident light is refracted by the crystal into first light and second light, and the first light and the second light are propagated in different directions in the crystal and have different propagation speeds, wherein a spatial frequency of the first light and a spatial frequency of the second light are less than a spatial frequency of the incident light, and a distance between the first light and the second light is a first preset distance.

7. The fingerprint recognition system according to claim 6, further comprising a screen and a recognition module, wherein the incident light is generated after the screen receives a pressing operation, the fingerprint information comprised in the incident light is fingerprint information corresponding to the pressing operation, and a spatial frequency of the incident light is a spatial frequency of the screen; and the recognition module is configured to recognize the fingerprint image.

8. The fingerprint recognition system according to claim 7, wherein the fingerprint module is rotatable relative to the screen, a rotation angle is less than a preset angle, and the preset angle is less than or equal to 5°.

9. The fingerprint recognition system according to claim 6, wherein a spatial frequency of the incident light before being incident to the lens is greater than a spatial frequency of the incident light after passing through the lens, and the spatial frequency of the incident light after passing through the lens is greater than a spatial frequency of the first light and a spatial frequency of the second light.

10. The fingerprint recognition system according to claim 6, wherein the first preset distance and a thickness of the crystal satisfy an equation:

$$d = T\frac{(n_o^2 - n_e^2)tg\theta}{n_o^2 tg^2\theta + n_e^2},$$

wherein d is the first preset distance, θ is an angle between the incident light and an optical axis, no is a refractive index of the second light, ne is a refractive index of the first light, and T is the thickness of the crystal.

11. The fingerprint recognition system according to claim 6, wherein the first preset distance is a distance between the first light and the second light after being emergent from the crystal, wherein the first preset distance is equal to (2n+1) fringe widths, one fringe width is one line pair, and n is an integer greater than or equal to 0.

12. The fingerprint recognition system according to claim 6, wherein a surface of the crystal is plated with an optical thin film, and the optical thin film is used to eliminate ultraviolet light and red light in the incident light.

13. An electronic device, comprising a fingerprint recognition system, the fingerprint recognition system comprising a fingerprint module, the fingerprint module comprising a lens, a crystal, and an optical fingerprint chip, the crystal being an anisotropic medium, wherein the lens is located on one side of the crystal, the optical fingerprint chip is located on another side of the crystal, and the optical fingerprint chip is fixed in a substrate of an electronic device; and incident light comprising fingerprint information is incident to the crystal through the lens and is incident to the optical fingerprint chip after being refracted by the crystal, the optical fingerprint chip is used for generating a fingerprint image, and the fingerprint image is used for fingerprint recognition, wherein the incident light is refracted by the crystal into first light and second light, and the first light and the second light are propagated in different directions in the crystal and have different propagation speeds, wherein a spatial frequency of the first light and a spatial frequency of the second light are less than a spatial frequency of the incident light, and a distance between the first light and the second light is a first preset distance.

14. The electronic device according to claim 13, further comprising a screen and a recognition module, wherein the incident light is generated after the screen receives a pressing operation, the fingerprint information comprised in the incident light is fingerprint information corresponding to the pressing operation, and a spatial frequency of the incident light is a spatial frequency of the screen; and the recognition module is configured to recognize the fingerprint image.

15. The electronic device according to claim 14, wherein the fingerprint module is rotatable relative to the screen, a rotation angle is less than a preset angle, and the preset angle is less than or equal to 5°.

16. The electronic device according to claim 13, wherein a spatial frequency of the incident light before being incident to the lens is greater than a spatial frequency of the incident light after passing through the lens, and the spatial frequency of the incident light after passing through the lens is greater than a spatial frequency of the first light and a spatial frequency of the second light.

17. The electronic device according to claim 13, wherein the first preset distance and a thickness of the crystal satisfy an equation:

$$d = T\frac{(n_o^2 - n_e^2)tg\theta}{n_o^2 tg^2\theta + n_e^2},$$

wherein d is the first preset distance, θ is an angle between the incident light and an optical axis, no is a refractive index of the second light, ne is a refractive index of the first light, and T is the thickness of the crystal.

\* \* \* \* \*

UNITED STATES PATENT AND TRADEMARK OFFICE
CERTIFICATE OF CORRECTION

PATENT NO. : 11,854,300 B2
APPLICATION NO. : 17/943821
DATED : December 26, 2023
INVENTOR(S) : Huaxin Lin It is certified that error appears in the above-identified patent and that said Letters Patent is hereby corrected as shown below:

In the Claims

Column 8, Line 50, Claim 3, delete "2," and insert -- 1, --

Column 8, Line 59, Claim 3, delete "no" and insert -- $n_o$ --

Column 8, Line 60, Claim 3, delete "ne" and insert -- $n_e$ --

Column 9, Line 65, Claim 10, delete "no" and insert -- $n_o$ --

Column 9, Line 66, Claim 10, delete "ne" and insert -- $n_e$ --

Column 11, Line 2, Claim 17, delete "no" and insert -- $n_o$ --

Column 11, Line 3, Claim 17, delete "ne" and insert -- $n_e$ --

Signed and Sealed this
Twentieth Day of February, 2024

*Katherine Kelly Vidal*

Katherine Kelly Vidal
*Director of the United States Patent and Trademark Office*